United States Patent
Modig (10) Patent No.: US 11,052,498 B2
(45) Date of Patent: Jul. 6, 2021

(54) INVERTIBLE PART LOADING SYSTEM

(71) Applicant: Modig Machine Tool US Inc., Chicago, IL (US)

(72) Inventor: David Erik Gustav Modig, Farjestaden (SE)

(73) Assignee: Modig Machine Tool US Inc., Chicago, IL (US)

( * ) Notice: Subject to any disclaimer, the term of this patent is extended or adjusted under 35 U.S.C. 154(b) by 76 days.

(21) Appl. No.: 16/411,324

(22) Filed: May 14, 2019

(65) Prior Publication Data

US 2019/0344394 A1 Nov. 14, 2019

Related U.S. Application Data

(60) Provisional application No. 62/671,006, filed on May 14, 2018.

(51) Int. Cl.
| | |
|---|---|
| *B23Q 1/26* | (2006.01) |
| *B23Q 39/02* | (2006.01) |
| *B23C 5/28* | (2006.01) |

(52) U.S. Cl.
CPC . *B23Q 1/26* (2013.01); *B23C 5/28* (2013.01)

(58) Field of Classification Search
CPC ...... B23Q 7/14; B23Q 11/08; B23Q 11/0053; B23Q 1/48; B23Q 1/26; B23Q 1/66; B23Q 39/028; B23C 5/28
See application file for complete search history.

(56) References Cited

U.S. PATENT DOCUMENTS

| | | | | |
|---|---|---|---|---|
| 5,439,431 A | * | 8/1995 | Hessbruggen | B23Q 37/00 483/14 |
| 5,781,983 A | * | 7/1998 | Gruner | B23Q 7/047 29/563 |
| 5,933,933 A | * | 8/1999 | Fritz | B23Q 1/03 29/33 P |
| 5,938,577 A | * | 8/1999 | Lindem | B23Q 1/017 408/234 |
| 6,387,026 B1 | | 5/2002 | Schweizer et al. | |
| 6,655,247 B1 | * | 12/2003 | Walker | B23Q 1/0009 82/122 |

(Continued)

OTHER PUBLICATIONS

PCT Patent Application PCT/US2019/032109 International Search Report and Written Opinion dated Sep. 9, 2019, 16 pages.

*Primary Examiner* — Nicole N Ramos
(74) *Attorney, Agent, or Firm* — Erise IP, P.A.

(57) ABSTRACT

An invertible part loading system includes a pallet adapted for holding articles for machining, a frame adapted for receiving the pallet, and latching mechanisms adapted for holding the pallet within the frame. A support structure is adapted to support the frame above a machining tool. An axle rotatably couples the frame with the support structure for allowing the pallet to be inverted, enabling the articles to face the machining tool from above, which allows chips of material to fall away from the articles. The axle rotates about a pivot axis aligned centrally through the frame. The pallet is adapted for rapid transfer on and off the part loading system via a compatible loading and storage assembly to reduce machining down time between swapping pallets. A two-sided pallet may be adapted to enable switching between parts, or between two sides of the same part, by inverting the pallet via the axle.

13 Claims, 13 Drawing Sheets

(56) References Cited

U.S. PATENT DOCUMENTS

| | | | |
|---|---|---|---|
| 7,493,687 B2* | 2/2009 | Hessbruggen | B23Q 1/012 |
| | | | 29/563 |
| 7,547,270 B1* | 6/2009 | Mischler | B23Q 11/0891 |
| | | | 409/134 |
| 8,661,950 B2* | 3/2014 | Hessbrueggen | B23Q 39/00 |
| | | | 82/1.11 |
| 9,539,686 B2* | 1/2017 | Tanaka | B23Q 7/046 |
| 2003/0182782 A1* | 10/2003 | Hessbruggen | B23Q 39/027 |
| | | | 29/27 C |
| 2004/0110614 A1* | 6/2004 | Hessbruggen | B23Q 11/08 |
| | | | 483/18 |
| 2006/0048614 A1* | 3/2006 | Lange | B23B 3/167 |
| | | | 82/129 |
| 2010/0044941 A1 | 2/2010 | Greffioz et al. | |
| 2011/0280692 A1 | 11/2011 | Evertz et al. | |
| 2017/0209975 A1* | 7/2017 | Geissler | B23Q 3/15706 |

* cited by examiner

INVERTIBLE PART LOADING SYSTEM

CROSS-REFERENCE TO RELATED APPLICATIONS

This application claims the benefit of U.S. Provisional Patent Application Ser. No. 62/671,006, entitled Invertible Part Loading System and filed May 14, 2018, the disclosure of which is herein incorporated by reference in its entirety.

BACKGROUND

1. Field of the Disclosure

Embodiments of this disclosure relate generally to machining of parts, and more specifically to improved part loading for inverted-machining of parts.

2. Description of the Related Art

U.S. Pat. No. 7,547,270 to Mischler et al. discloses a machine tool with an optimally positioned operator station and a work table that is turned vertically. U.S. Pat. No. 6,138,818 to Green discloses a workpiece inversion system for milling machines that rotates workpieces as they enter a milling machine and re-orients them after milling. German Patent DE4117723 discloses a machine for milling workpieces located above the machine tools with two workpiece carriers that can each be pivoted one at a time for milling. U.S. Pat. No. 8,561,284 to Greffioz et al. discloses a machining tunnel for providing overhead machining of a part.

SUMMARY

In an embodiment, a milling unit includes a pallet adapted for holding one or more articles for machining and a support structure adapted to rotatably suspend the pallet above a machining tool such that the pallet is invertible via rotation about a pivot axis aligned centrally through the pallet.

In another embodiment, an invertible part loading system includes a pallet adapted for holding one or more parts, a frame adapted for receiving the pallet, a plurality of inner latching mechanisms adapted for holding the pallet within the frame, a support structure adapted to support the frame above a machining tool, and an axle that rotatably couples the frame with the support structure for allowing the pallet to rotate above the machining tool. The axle rotates about a pivot axis aligned centrally through the frame.

In yet another embodiment, an overhead part loading system for inverted machining is provided. The system includes a pallet adapted for holding one or more articles for machining. A support structure is adapted to suspend the pallet above a machining tool. An axle rotatably couples the pallet with the support structure for partially or fully rotating the pallet to provide varied access of the machining tool to the one or more articles.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Milling operations are traditionally performed with a machine head located above a workpiece to be milled into a part. As material is shaved from the workpiece by a cutting tool of the machine head, the chips of material must be removed to prevent excess wear of the cutting tool and potential damage to the part.

Embodiments of the present disclosure provide a milling machine unit having a pallet adapted for securing one or more parts above a machine head. The pallet is suspended above a milling machine, and the pallet may be rotated via an axle such that the one or more parts face the machine head from above. During milling operations, the arrangement of the part above the machine head allows the chips of material to fall away from the part. Embodiments of the present disclosure are adapted for receiving a very large part on the pallet, or for receiving multiple smaller parts on the pallet. The pallet is adapted for rapid transfer on and off the milling machine via a compatible loading and storage assembly to ensure limited machining down time between swapping pallets. In certain embodiments, a two-sided pallet may be adapted with parts on both sides to enable switching between parts by inverting the pallet via the axle without requiring swapping of pallets.

Figure 1:
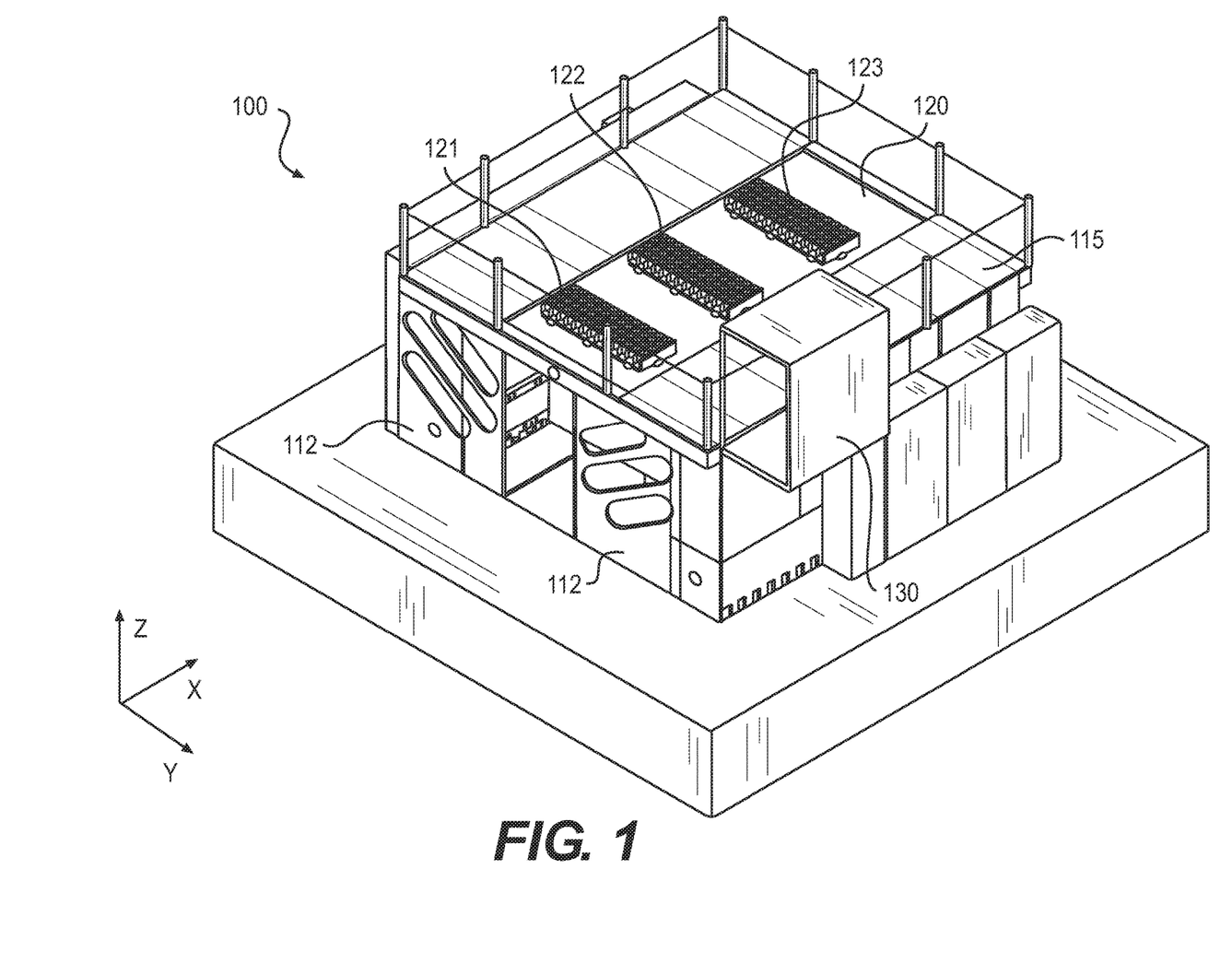
FIG. 1 is a perspective view of an embodiment of a milling unit having an invertible part loading system.

FIG. 1 is a perspective view of an embodiment of a milling unit having an invertible part loading system 100. System 100 includes a pallet 120 adapted to hold one or more parts during milling processes. As used herein, the term "pallet" is a structure adapted for supporting one or more parts and for being transferred on and off the milling unit. As depicted in FIG. 1, pallet 120 is adapted for supporting three parts, specifically a first part 121, a second part 122, and a third part 123. Pallet 120 may be configured to support greater than or fewer than three parts without departing from the scope hereof. The parts may be an article for machining such as a workpiece at any stage of manufacture (e.g., a raw material prepared for initial milling). Exemplary workpiece materials include but are not limited to aluminum, titanium, metal alloys, and plastics. Parts 121-123 may be mounted to pallet 120 via a variety of means depending on the type of part to be machined (e.g., latching mechanism, pneumatic clamp, spring-loaded clamp, hydraulic clamp, pin, bracket, etc.).

An operator station 130 is adapted as an elevator for raising and lowering one or more operators of system 100 between a lower level and an upper level. A platform 115 provides a surface for the operator to walk on both sides of pallet 120 for inspecting parts 121-123 and assisting with their loading and unloading. Sliding doors 112 enable opening and closing a front side of the lower level. Doors may also be located on a back side of system 100 (not shown) in certain embodiments. The lower level houses a machine head for milling the parts and the upper level supports the invertible pallet 120 for positioning the parts above the machine head, as further described below. An X, Y, Z coordinate system is depicted in the figures to provide a reference orientation for description of system 100 components and their movements. Drawings may not be to scale for clarity of illustration.

Figure 2:
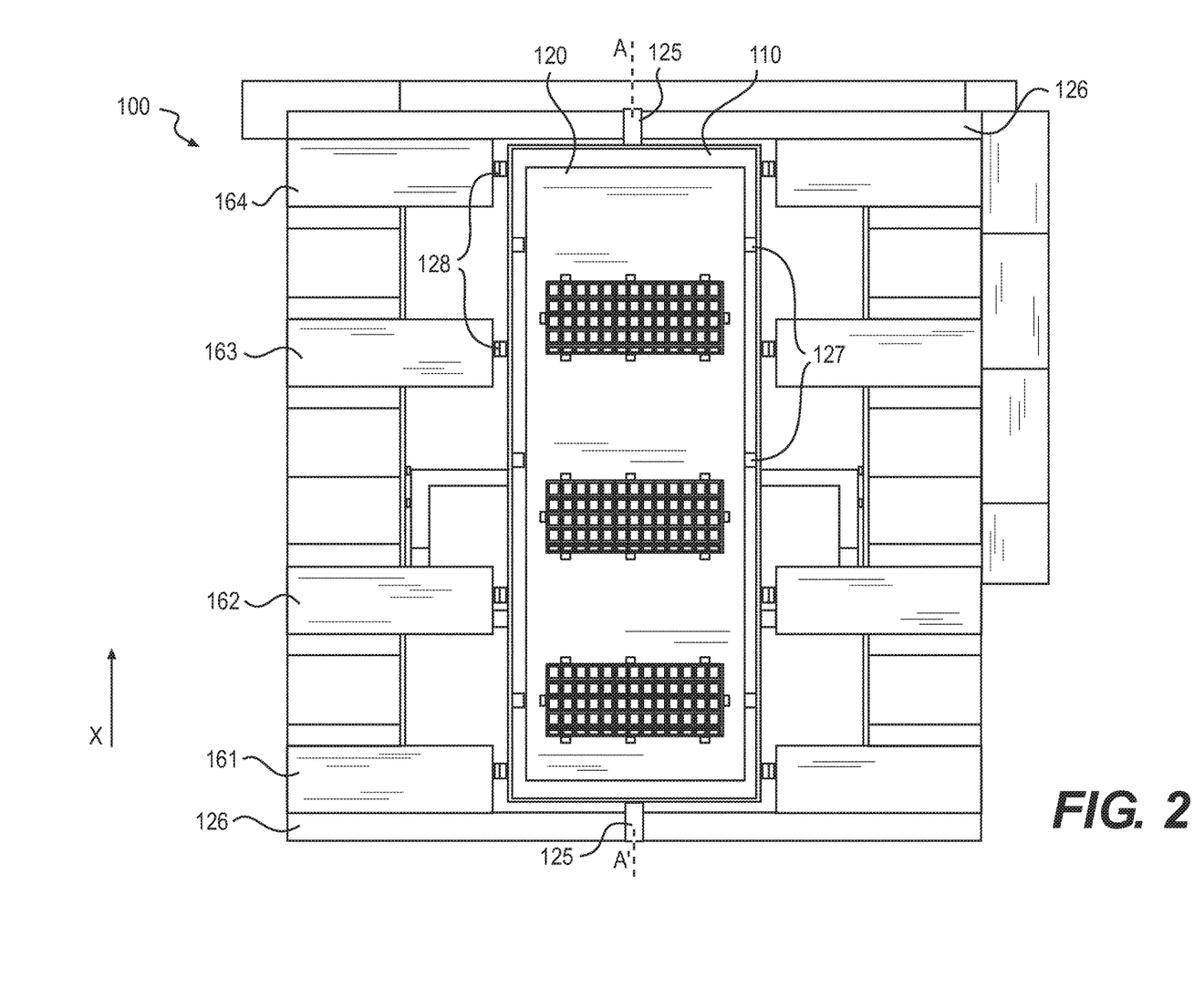
FIG. 2 is a top-down view of the system of FIG. 1 with components removed for viewing.

FIG. 2 is a top-down view of the system 100 with some external components (e.g., platform 115) removed to enable viewing of interior components. A support structure is provided for supporting pallet 120 in a raised configuration such that a machine head for milling the parts may be positioned beneath pallet 120. The support structure includes pillars 161, 162, 163, 164 on a first side and a matching set of pillars (unlabeled in FIG. 2) on a second side opposite the first side. The support structure also includes a pair of beams 126 adapted to provide mechanical support for suspending pallet 120 above the machine head. In certain embodiments, beams 126 are adapted to enable rotation of pallet 120. For example, an axle 125 may be rotatably coupled to beams 126 (e.g., via bearings) for rotating about a pivot axis. In some embodiments, the pivot axis of axle 125 is aligned substantially along a central portion of pallet 120 in the longitudinal direction. In the embodiments depicted in FIGS. 2 and 3, the pivot axis is indicated by the dashed line A-A'

Parts 121-123 may be preloaded onto pallet 120 at a separate location, then pallet 120 is subsequently loaded onto system 100. Loading and unloading of pallet 120 may be performed using a compatible part-transfer assembly (not shown) designed for loading and unloading parts. The part-transfer assembly may be a separate system adapted for retrieving pallet 120 from a storage rack, transporting pallet 120 to system 100, and transferring pallet 120 onto system 100. After milling operations have been completed on parts 121-123, pallet 120 may be retrieved from system 100 and returned to the storage rack via the part-transfer assembly. Exemplary part transfer assemblies may include cranes, gantry cranes, and fork lifts but are not limited to these examples.

A pallet-receiving device 110 is adapted for receiving pallet 120. Pallet-receiving device 110 is for example a frame having four sides and optionally a platform within the frame. In certain embodiments, the part-transfer assembly is used to lower pallet 120 until it is aligned within pallet-receiving device 110, thereby enabling pallet 120 to be latched to pallet-receiving device 110 as further described below. In some embodiments, pallet-receiving device 110 includes one or more rails for receiving pallet 120 and the part-transfer assembly is used to slide pallet 120 onto the rails. However, system 100 may be adapted to receive pallets using a variety of different methods without departing from the scope hereof.

In certain embodiments, pallet-receiving device 110 is mechanically coupled to axle 125 thereby enabling pallet-receiving device 110 and pallet 120 to be inverted by rotation of axle 125 as it spins in place about pivot axis A-A'. In this manner, the pallet does not translate as it rotates but instead spins about a centrally aligned axis to maintain its position. The pallet-receiving device may be inverted by rotating 180-degrees for transitioning from a first orientation (e.g., upright) to a second orientation (e.g., upside-down). However, rotation of pallet-receiving device 110 via axle 125 may include partial rotations (e.g., less than 180-degrees) without departing from the scope hereof. Rotation of axle 125 may be provided in a clockwise or a counter-clockwise direction. In some embodiments, a motor (e.g., a servomotor) is coupled to axle 125 for driving its rotation. Control of the motor may be provided manually by the operator or via a controller, e.g., a digital programmable controller such as a programmable logic controller (PLC), microcontroller, etc., without departing from the scope hereof.

A plurality of inner latching mechanisms 127 are provided inside pallet-receiving device 110 for temporarily securing pallet 120 within pallet-receiving device 110. When pallet 120 is inverted via rotation of axle 125, inner latching mechanisms 127 are adapted to hold pallet 120 securely within pallet-receiving device 110. A plurality of outer latching mechanisms 128 are provided outside pallet-receiving device 110 for temporarily securing pallet-receiving device 110 to prevent rotation about axle 125 (e.g., during milling operations and while loading/unloading pallet 120). Inner and outer latching mechanisms 127, 128 may be positioned along the sides of pallet 120 and pallet-receiving device 110, respectively, as depicted in FIG. 2, or in other locations such as the ends of pallet 120 without departing from the scope hereof. In certain embodiments, outer latching mechanisms 128 mechanically couple to pillars 161, 162, 163, 164 on a first side and to a matching set of pillars on a second side opposite the first side, as depicted in FIG. 2 and further described below in connection with FIG. 8.

Figure 3:
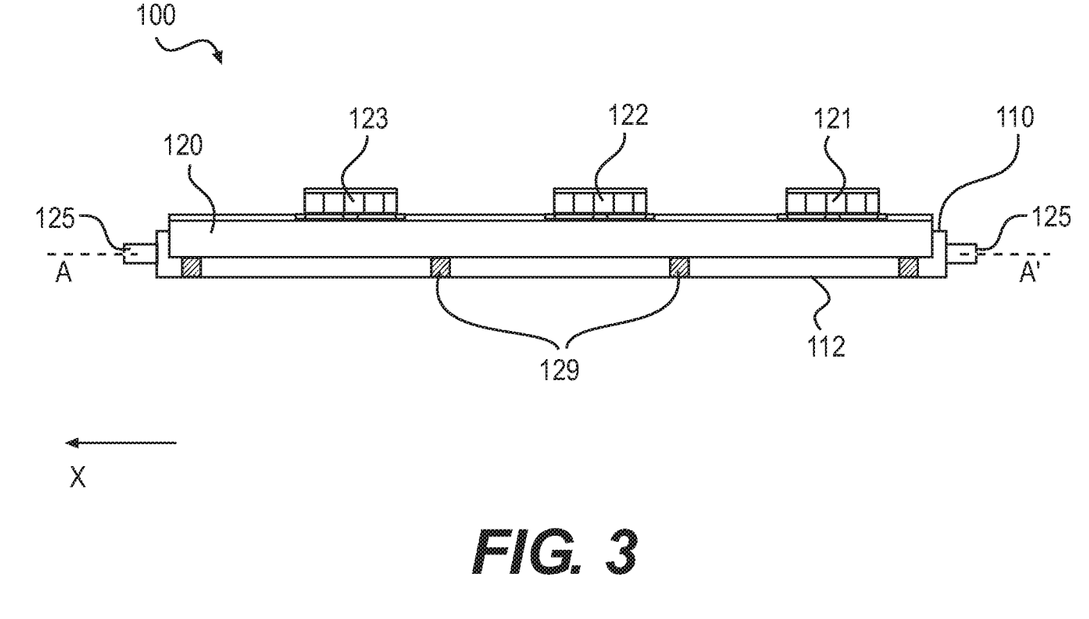
FIG. 3 is a cross-sectional side-view of portions of the system of FIG. 1, in an embodiment.

FIG. 3 is a cross-sectional side-view of an exemplary pallet-receiving device 110 having an optional lower platform 112 beneath pallet 120. In certain embodiments, pallet-receiving device 110 may include additional latching mechanisms 129 positioned on lower platform 112 beneath pallet 120 for holding pallet 120 in place.

Figure 4:
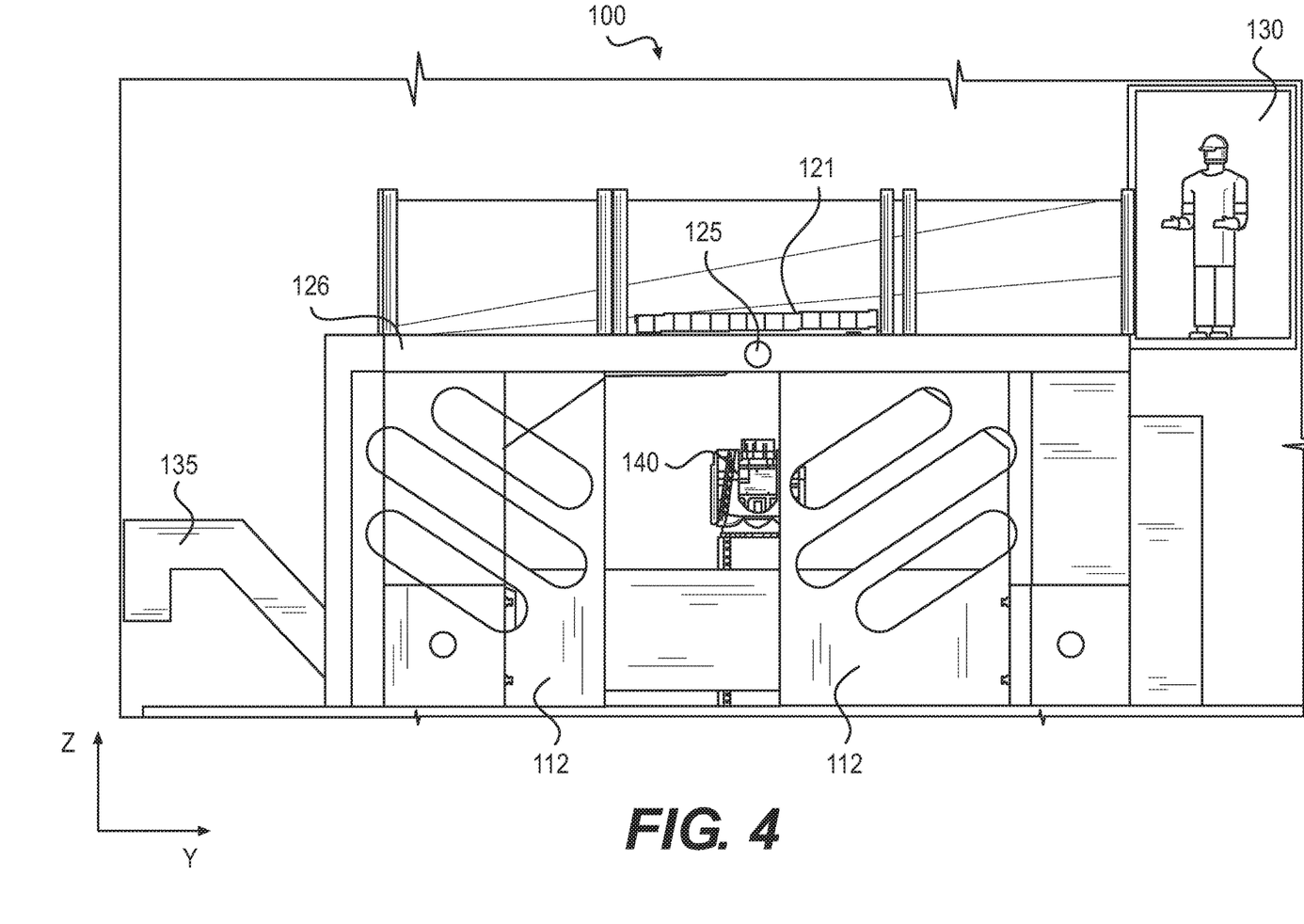
FIG. 4 is a front view of the system of FIG. 1.

FIG. 4 is a front view of system 100. A machine head 140 is provided beneath pallet 120. Machine head 140 may include a spindle for rotating a cutting tool designed to cut away chips of material from a workpiece. Pallet-receiving device 110 may be rotated via axle 125 to invert pallet 120 such that parts 121-123 are facing downward and toward machine head 140, as described below in connection with FIGS. 5 and 6. The pallet 120 spins about axle 125 without altering its position. In other words, the pallet 120 does not translate from an adjacent position or flip over along its end or side, but instead pallet 120 rotates in place.

Figure 5:
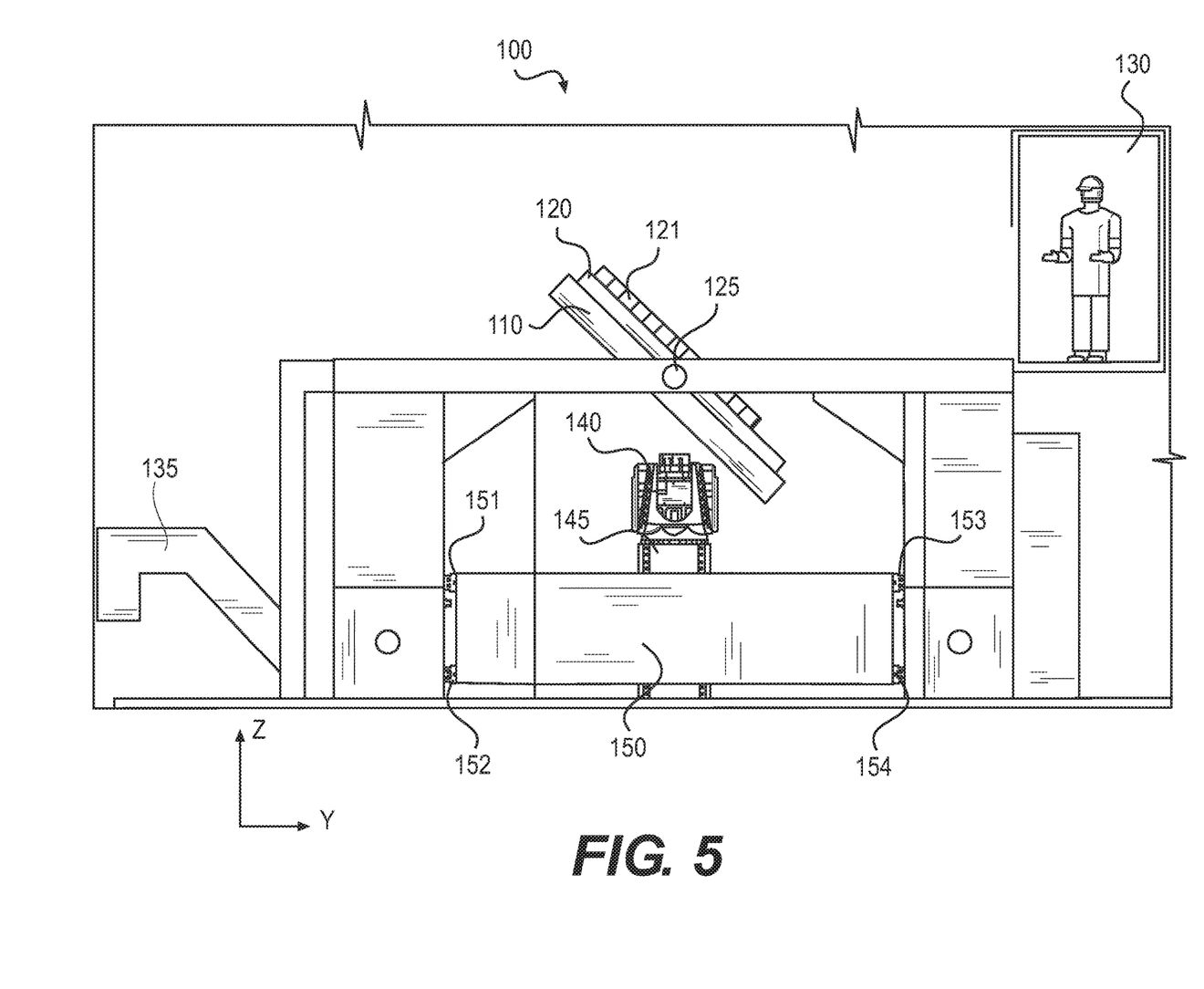
FIG. 5 is a front view of the system of FIG. 1 with a pallet partially rotated.

FIG. 5 is a front view of system 100 with pallet 120 partially rotated during transformation from a loading configuration to a milling configuration. Portions of system 100 are removed in the view of FIGS. 5-7 (e.g., doors 112) for clarity of illustration. As depicted in FIG. 5, pallet-receiving device 110, pallet 120, and parts 121-123 collectively rotate about axle 125 above machine head 140. In order to accommodate space for pallet-receiving device 110 and pallet 120 to rotate within lower level, machine head 140 may be lowered and/or translated to one end or one side of its operating envelope to avoid interaction with pallet 120, as further described below in connection with FIG. 13.

In certain embodiments, pallet-receiving device 110 is adapted for securing two pallets that face opposite directions providing a two-sided arrangement. For example, a first pallet faces upwards while at the same time a second pallet faces downwards. The first and second pallets may be secured via inner latching mechanisms 127 and optionally via additional latching mechanisms 129 on a platform (e.g., like platform 112, FIG. 3) between the first and second pallets. Pallet-receiving device 110 may be inverted via rotation of axle 125 to spin in place for switching between the first and second pallets facing machine head 140, which enables access by the machine head 140 to parts on both pallets.

In some embodiments, a double-sided pallet is used in which parts are attached to two sides of the pallet making them accessible for milling on either side of the same pallet. The double-sided pallet is held inside pallet-receiving device 110 (in an embodiment without a platform 112) via inner latching mechanisms 127. By rotating axle 125, the parts on both sides of the double-sided pallet are exposed to machine head 140, which effectively doubles the number of parts to be machined for each loading and unloading of pallet 120.

In another embodiment, pallet 120 includes an opening, and pallet-receiving device 110 either lacks a platform 112 or has openings in platform 112 such that one or more parts may be accessed from both sides. The one or more parts may be suspended within pallet 120 via a latching mechanism, pneumatic clamp, spring-loaded clamp, hydraulic clamp, pin, bracket, etc. such that two sides of the one or more parts are exposed for machining. In certain embodiments, parts 121-123 may be held within pallet 120 and pallet-receiving device 110 such that at least a portion of opposing sides of parts 121-123 are exposed through pallet 120 and pallet-receiving device 110. This arrangement allows for milling/cutting operations to be performed on opposing sides of each part without removing the part from the pallet. Instead, pallet 120 is simply inverted via axle 125 between machining steps, without requiring unloading and reloading of the workpiece or part. For example, a first side of the part may be milled, followed by rotating of pallet 120 by 180-degrees to allow for milling on a second side of the part, opposite the first side.

Machine head 140 is, in some embodiments, a five-axis machine head capable of moving in five axes. For example, a machine body 145 supporting the machine head 140 may translate longitudinally in the X-axis, transversely in the Y-axis, and vertically in the Z-axis, while the machine head 140 may pivot and rotate atop machine body 145, as further described below. Translation in the X, Y, and Z axes may be accomplished using a translation subsystem having linear actuators aligned along the X, Y, and Z axes, respectively. For example, as depicted in FIG. 5, a first support member 150 may be slid longitudinally in the X-axis along rails (see e.g., rails 183, 184 of FIG. 11 and rails 181, 182 of FIG. 13) via a first slider 151, a second slider 152, a third slider 153, and a fourth slider 154. In certain embodiments, the sliders 151-154 translate along the rails via a ball-screw mechanism under control of an electro-mechanical controller.

Figure 6:
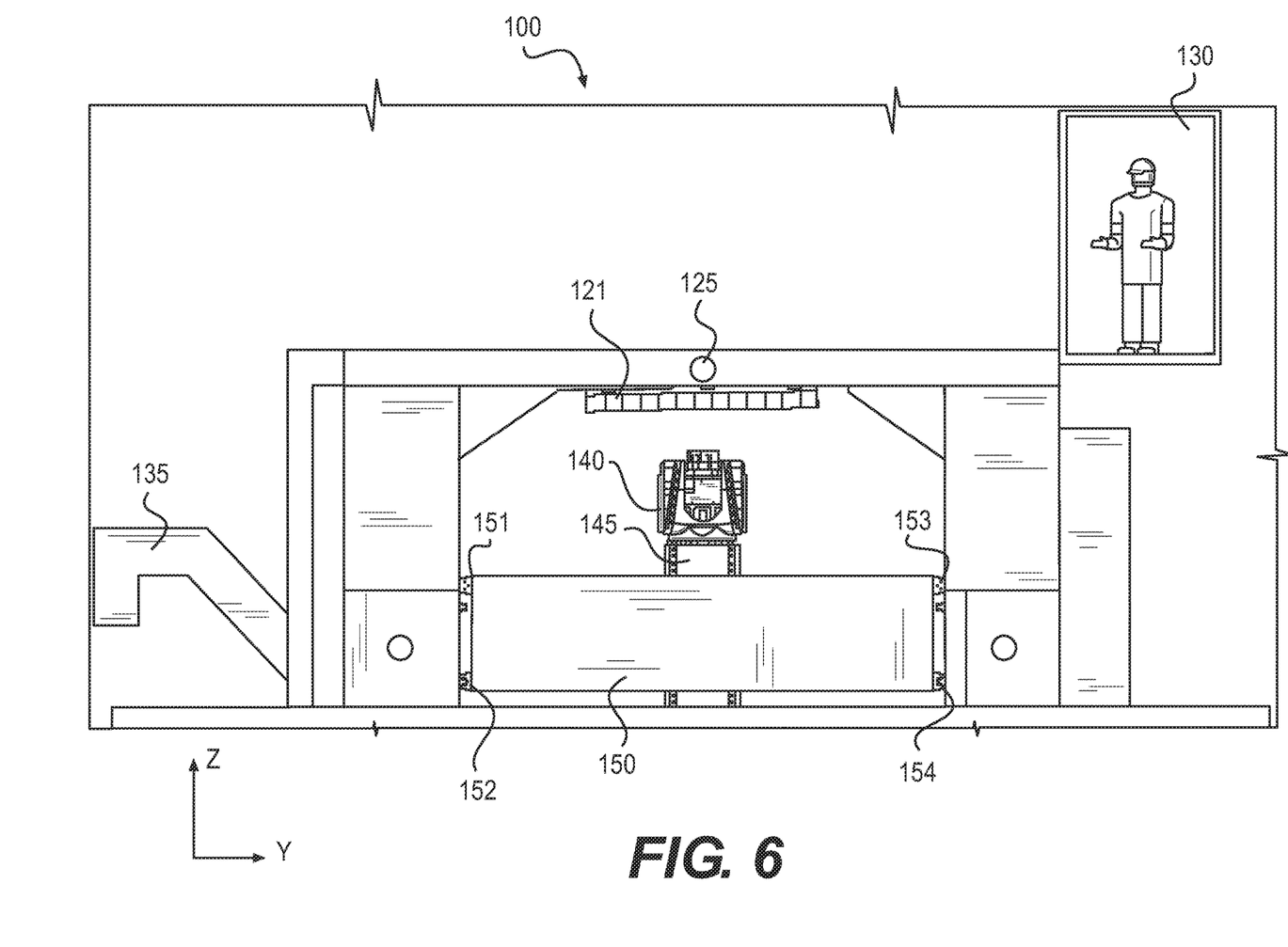
FIG. 6 is a front view of the system of FIG. 1 with the pallet rotated to a substantially inverted position.
Figure 7:
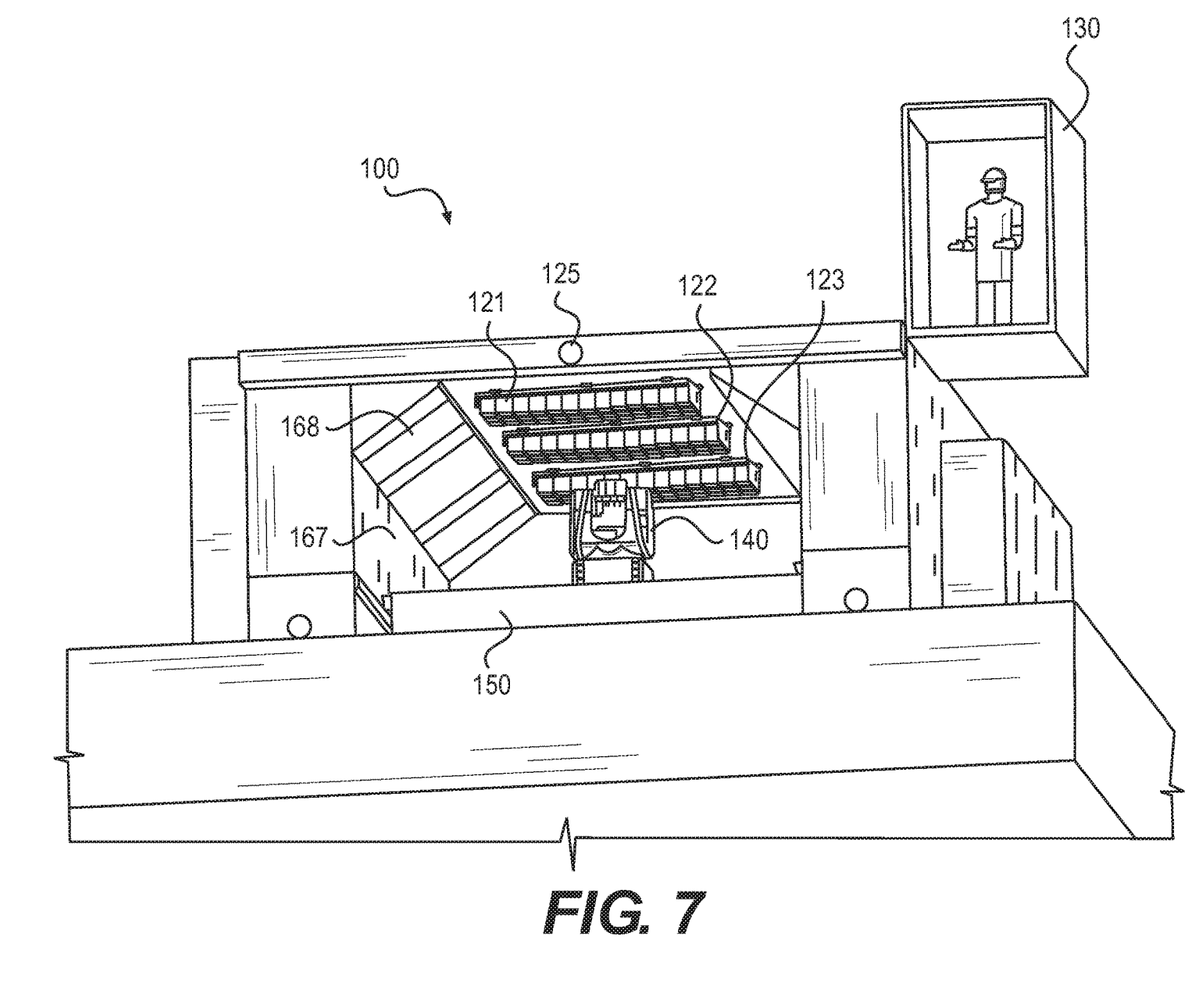
FIG. 7 is a perspective view of the system of FIG. 1 from the front with the pallet rotated to the substantially inverted position.

FIG. 6 is a front view of system 100 with pallet 120 rotated to a substantially inverted position (e.g., 180-degrees from the upright orientation of FIG. 5). FIG. 7 is a perspective view of system 100 from the front, with pallet 120 rotated to the substantially inverted position as in FIG. 6. FIGS. 6 and 7 are best viewed together with the following description. The substantially inverted position of pallet 120 enables parts 121-123 to be positioned facing downward and toward machine head 140. Machine head 140 may be raised vertically (in the Z-axis) to reach one of parts 121-123 for milling. Panels may be provided along interior portions of system 100 to form walls that face machine head 140. For example, as depicted in FIG. 7, a vertical panel 167 and an angled panel 168 form an interior wall along a left side of system 100.

In certain embodiments, rotation of pallet 120 is stopped prior to full inversion. For example, rotation of pallet 120 may be about 90-degrees from the upright orientation of FIG. 5, which may be beneficial for part inspections, and partial rotation enables machining along sides of a part. Due to the freely pivotable axle 125, a rotation of any degree may be attained for pallet 120, and any degree of rotation may be maintained for pallet 120 (e.g., via the motor coupled to axle 125 and/or latching mechanisms, similar to outer latching mechanisms 128) during machining operations and/or inspections.

Figure 8:
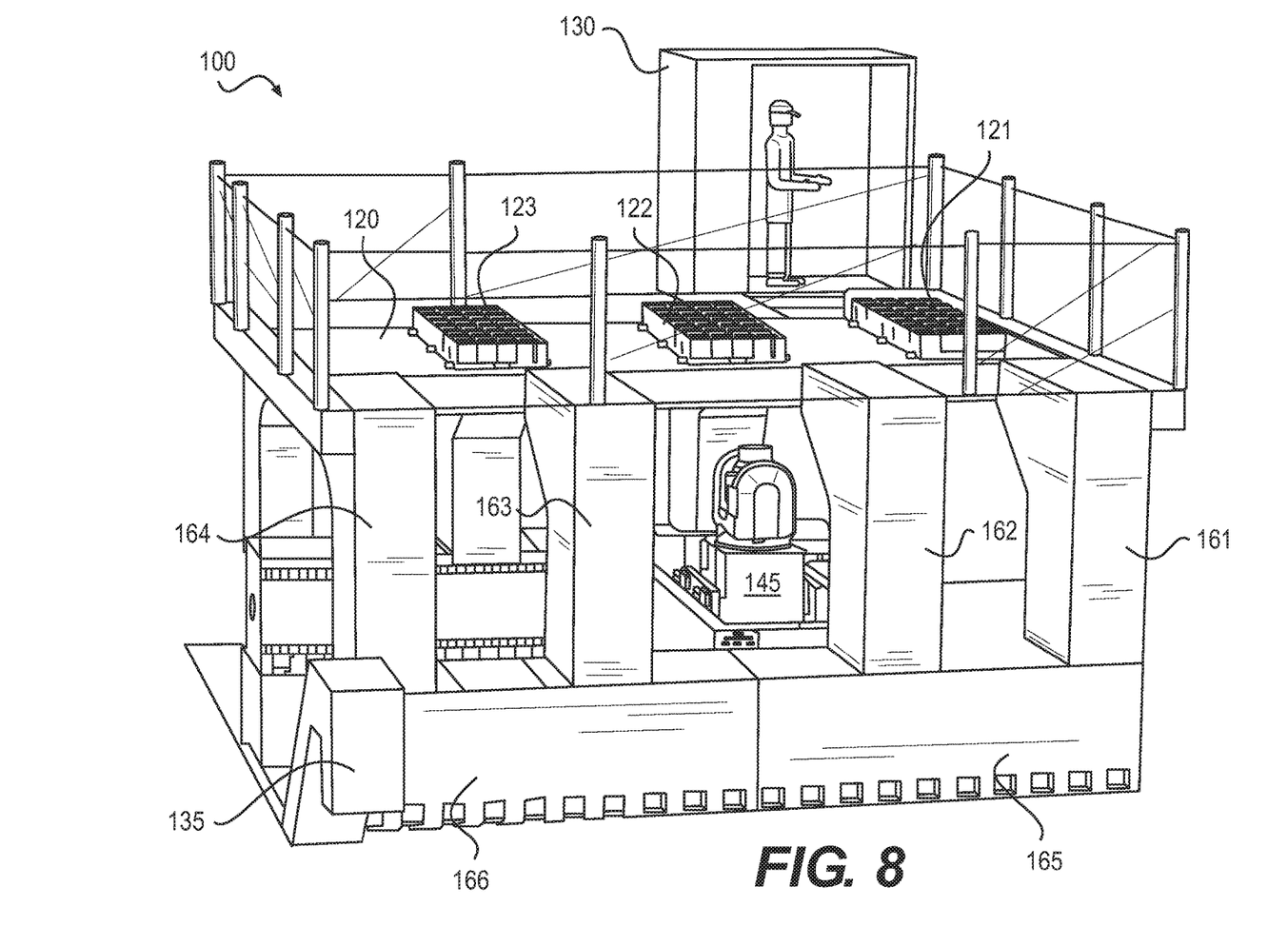
FIG. 8 is a perspective view of the system of FIG. 1 from the left side.

FIG. 8 is a perspective view of system 100 from the left side. Outer and inner panels along the sides of system 100 are removed for clarity of illustration. A plurality of pillars supports the upper level including supports 126 and platform 115. For example, as depicted in FIG. 8, a first pillar 161, a second pillar 162, a third pillar 163, and a fourth pillar 164 are positioned along the left side of system 100. A matching set of pillars is also provided on the right side of system 100, opposite first through fourth pillars 161-164. In certain embodiments, the pillars are formed of cast iron.

A first base block 165 and a second base block 166 are positioned beneath a lower portion of pillars 161-164 for supporting the pillars and for mounting rails (e.g., rails 183, 184 of FIG. 11) that enable movement of machine body 145. A matching pair of base blocks are provided on the right side of system 100, opposite first and second base blocks 165, 166. In certain embodiments, the base blocks are formed of cast iron.

Figure 9:
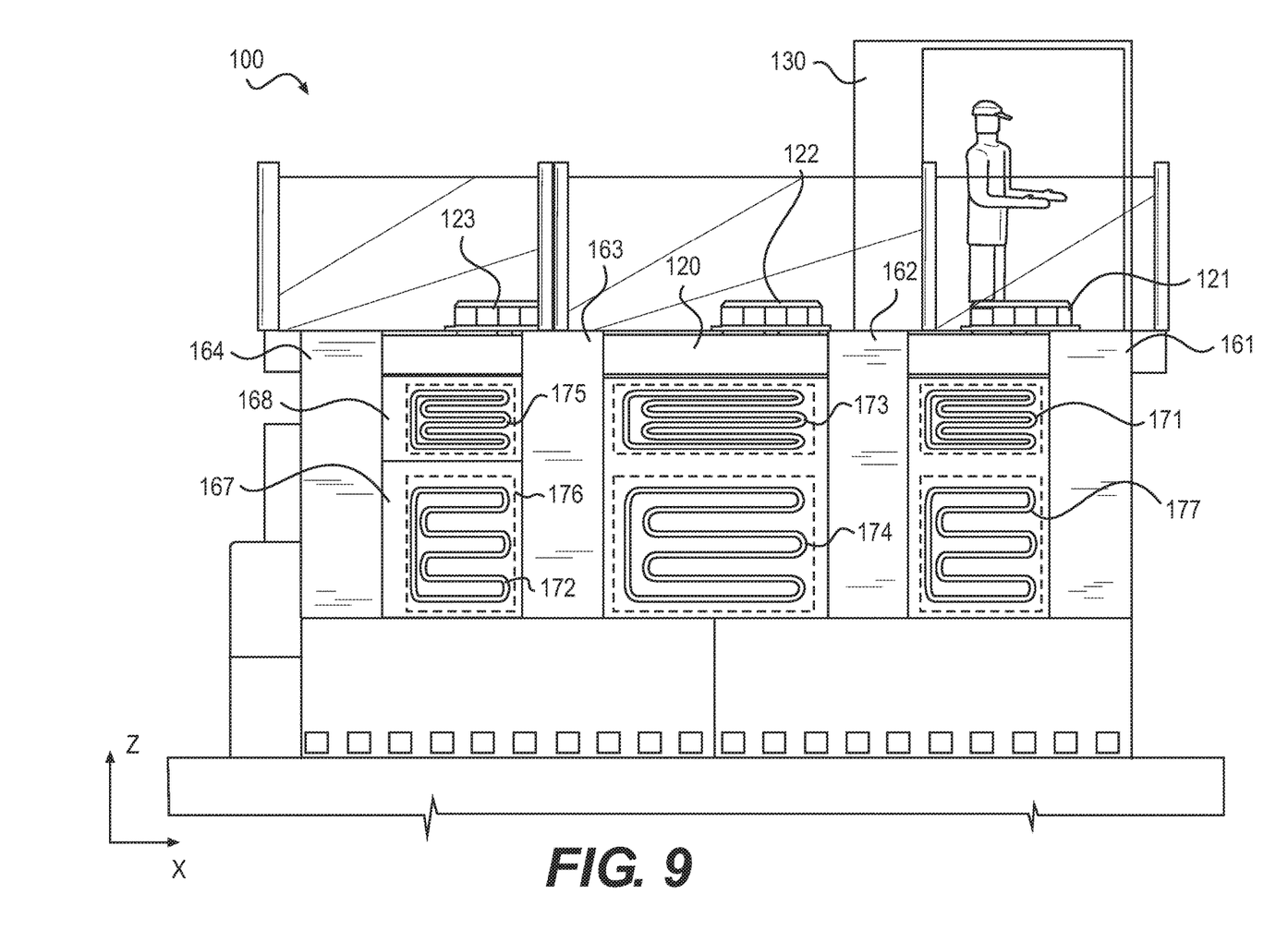
FIG. 9 is a side view of the system of FIG. 1 from the left side.

FIG. 9 is a side view of system 100 from the left side. Outer panels of system 100 are removed to reveal vertical panel 167 and angled panel 168 along an interior side of pillars 161-164. In certain embodiments, a cooling subsystem removes heat generated during the milling process. The cooling subsystem prevents large temperature increases to minimize thermal expansion of the part being machined and to reduce expansion in the structures of system 100. For example, and expansion due to heat may become so great that it alters the three-dimensional distances between the machine head 140 and the part being machined. This disrupts computer-aided milling processes and can lead to manufacture defects. Thus, heat removal is beneficial in the disclosed system for maintaining conformity of the part being machined and for maintaining positional integrity of pallet-supporting structures.

To provide cooling, portions of system 100 may include fluid cooling loops for removing heat from system 100. In the embodiment depicted in FIG. 9, exemplary fluid cooling loops are shown along vertical panel 167 and angled panel 168, namely a first, second, third, fourth, fifth, and sixth cooling loop 171, 172, 173, 174, 175, 176, respectively. Cooling loops 171-176 may be interconnected to form fewer than six loops (e.g., a single fluid loop) without departing from the scope hereof. Matching vertical and angled panels on the right (far) side of system 100 may also include fluid cooling loops (not shown).

Cooling loops 171-176 are adapted to maintain thermal contact with internal panels 167, 168 for providing effective heat transfer (e.g., by being mounted to panels 167, 168, or by being internally routed through panels 167, 168). Cooling loops 171-176 are fluidly coupled with a pump for circulating the fluid. A temperature control subsystem may be used to monitor the internal temperatures of system 100 and control flow of fluid through cooling loops 171-176. Heat from cooling loops 171-176 may be dumped externally (e.g., via an air heat exchanger located outside of a building that houses system 100). In certain embodiments, the fluid used in cooling loops 171-176 is substantially made of water. Cooling loops 171-176 remove heat generated during the milling process, which is important for maintaining conformity of the part being machined. Cooling loops 171-176 provide a substantially larger capacity for heat removal compared to an air conditioning system. However, dedicated air conditioning systems could be used instead of or in addition to the fluid cooling subsystems described already.

Figure 10:
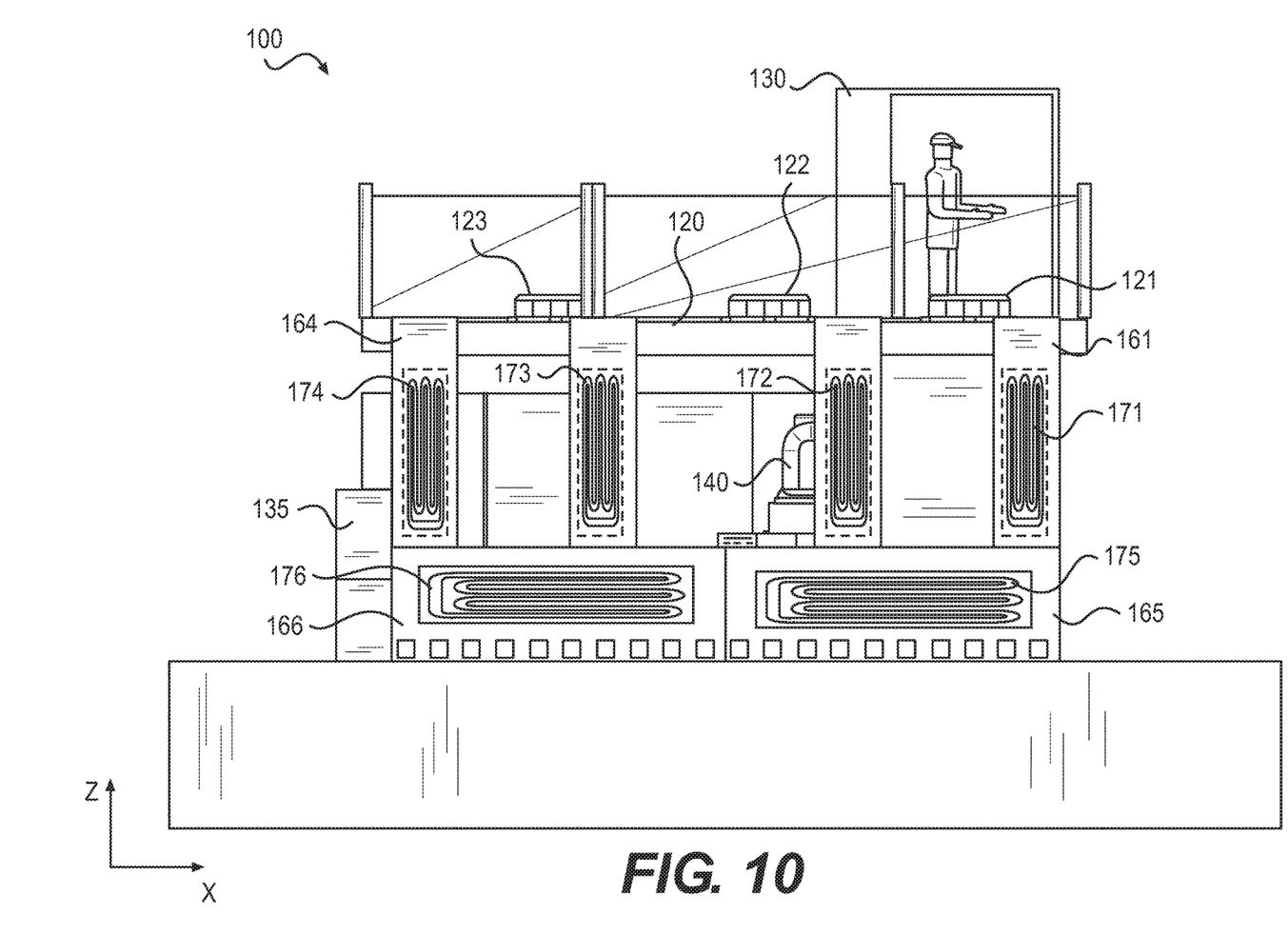
FIG. 10 is another side view of the system of FIG. 1 from the left side.

FIG. 10 is a side view of system 100 from the left side. Outer and inner panels along the sides of system 100 are removed for clarity of illustration. In some circumstances, cooling loops located on or inside internal panels 167, 168 may provide insufficient heat transfer requiring the use of additional cooling loops. Particularly in embodiments where pillars 161-164 and/or base blocks 165, 166 are made of cast iron, the cast iron may become hot during the milling process requiring additional cooling. As a result, additional cooling loops may be provided on or inside the pillars and base blocks of the support structure of system 100. In certain embodiments, at least one member of the support structure of system 100 includes a fluid cooling loop. In the embodiment depicted in FIG. 10, first, second, third, and fourth cooling loops 171, 172, 173, 174 are adapted for removing heat from first, second, third, and fourth pillars 161, 162, 163, 164, respectively. Similarly, fifth and sixth cooling loops 175, 176 are adapted for removing heat from first and second base blocks 165, 166, respectively. Matching pillars and base blocks on the right (far) side of system 100 may also include internal fluid cooling loops (not shown).

Figure 11:
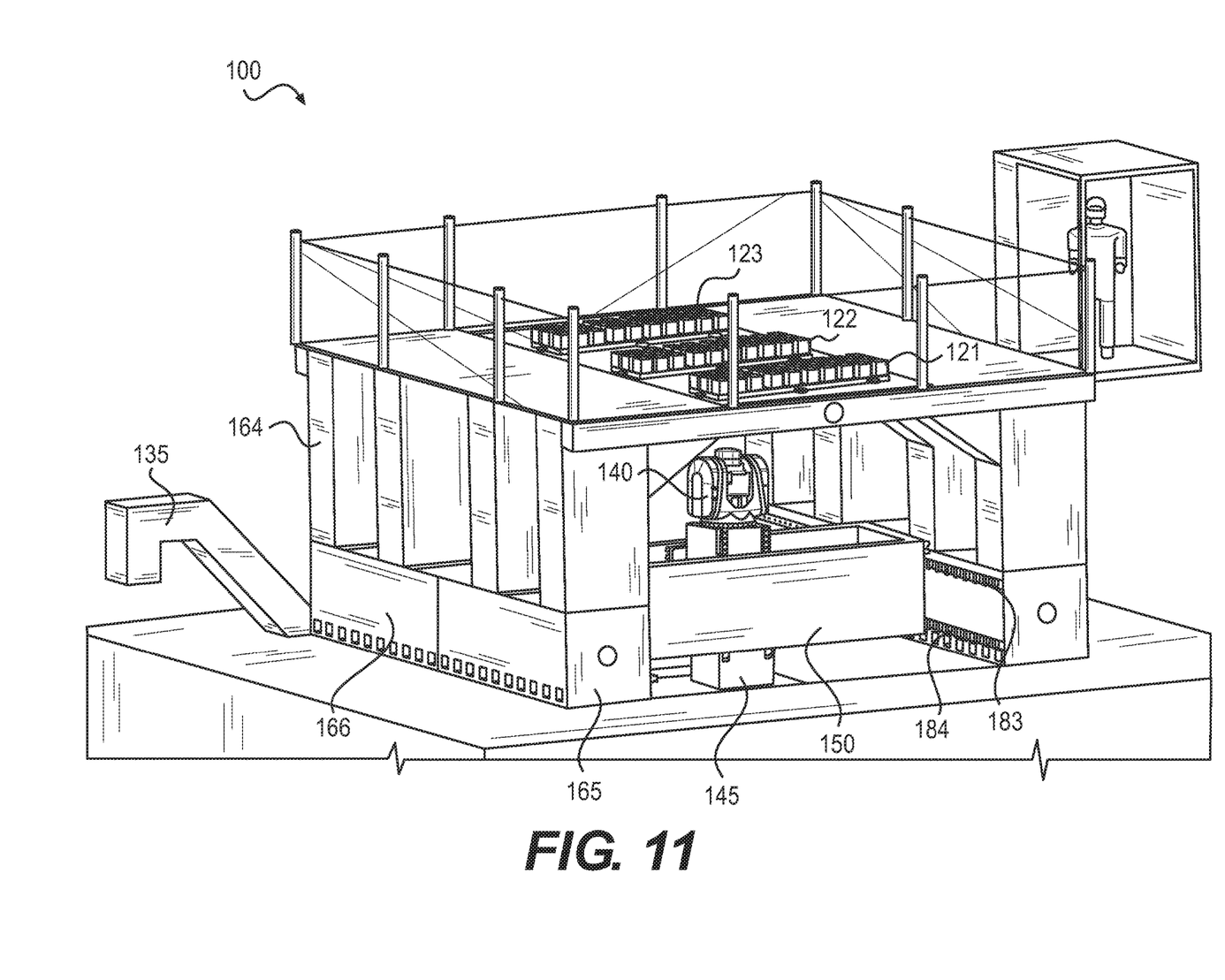
FIG. 11 is a perspective view of the system of FIG. 1.
Figure 12:
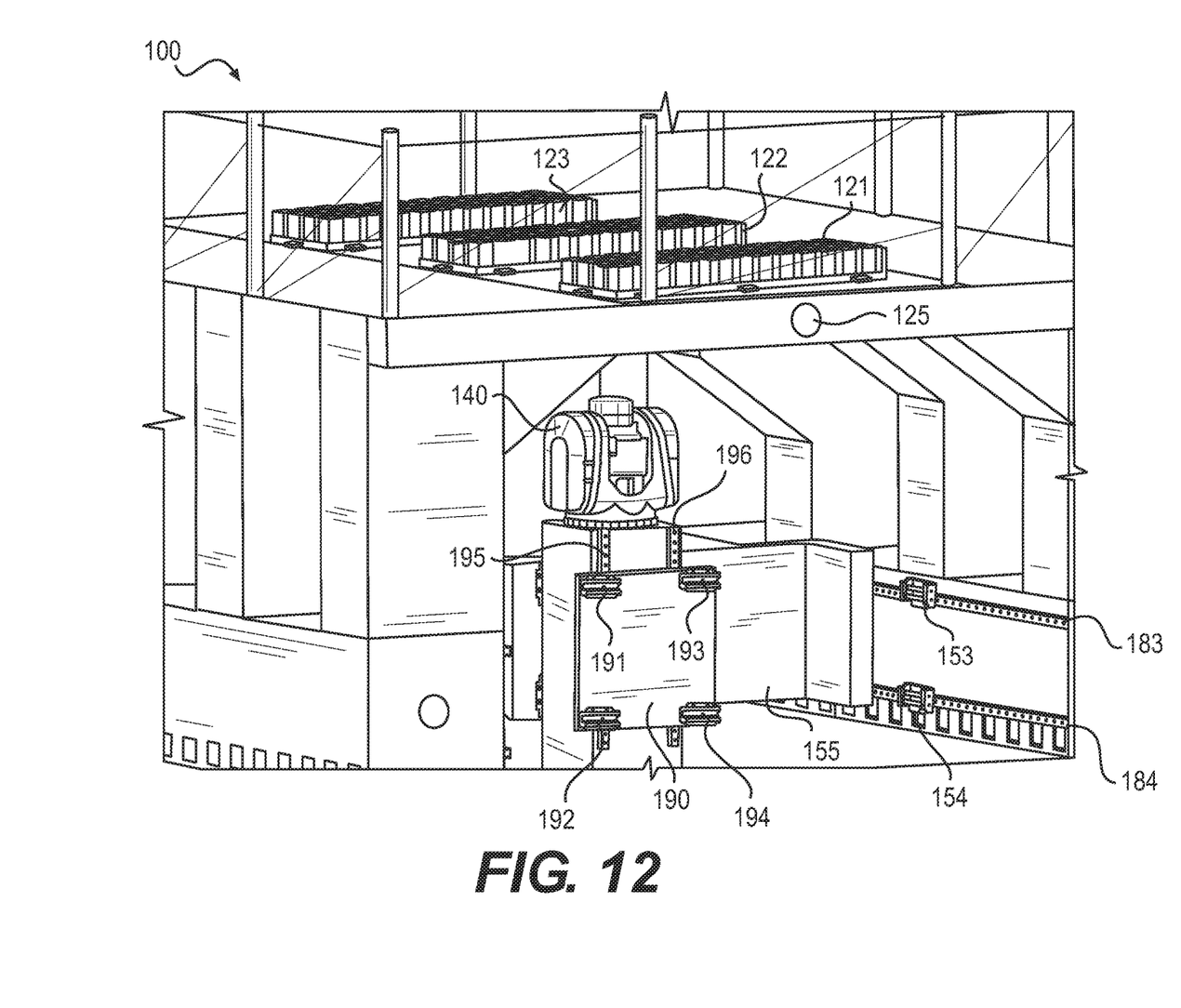
FIG. 12 is a perspective view of the system of FIG. 1 with components removed for viewing.
Figure 13:
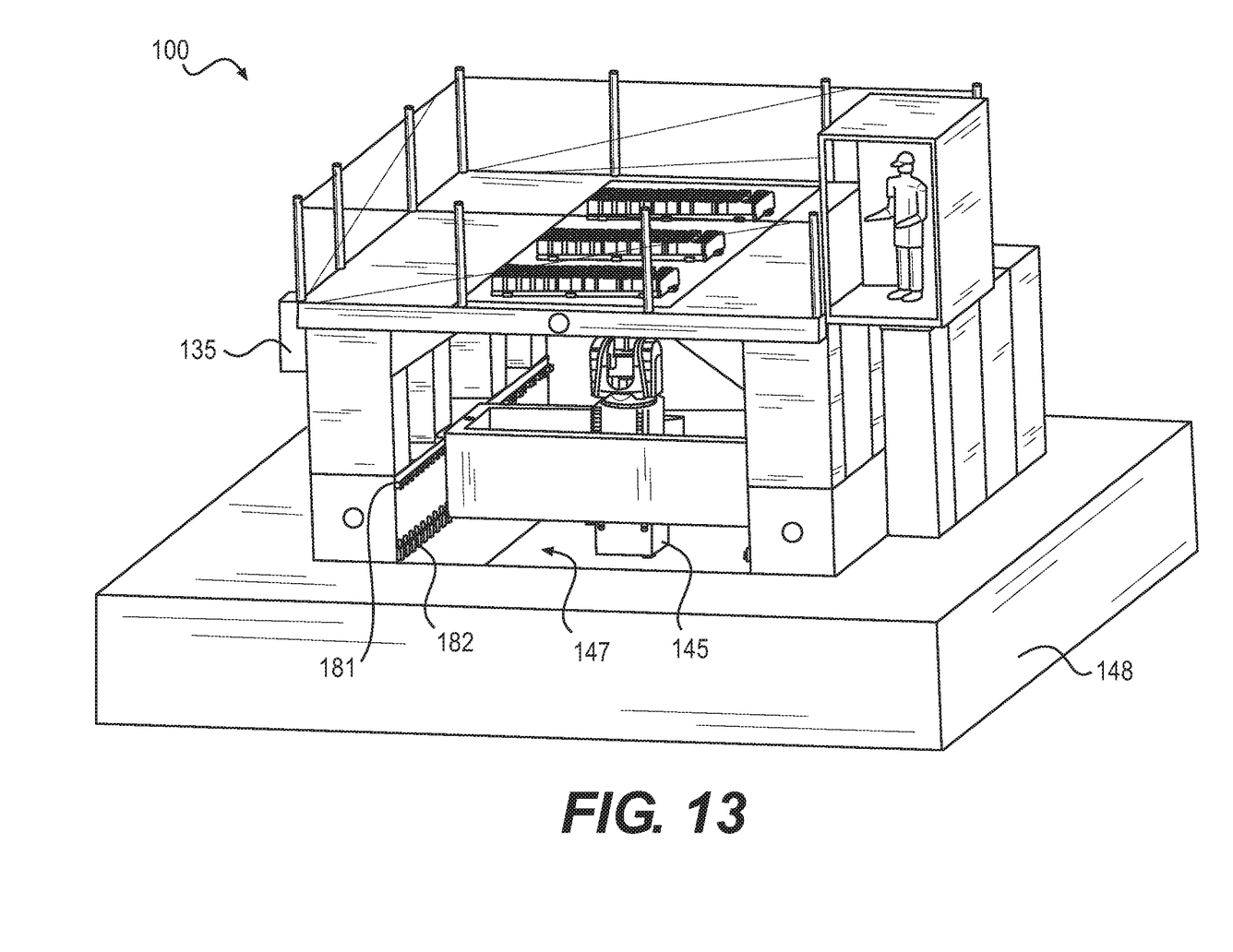
FIG. 13 is another perspective view of the system of FIG. 1.

FIG. 11 is a perspective view of system 100 with outer and inner panels along the sides of system 100 and doors 112 removed for clarity of illustration. An upper rail 183 and a lower rail 184 are configured for mechanically coupling with first support member 150 about one end such that first support member 150 moves longitudinally along the X-axis by linear actuation along upper and lower rails 183, 184. The opposite end of first support member 150 includes matching upper and lower rails 181, 182 as depicted in FIG. 13 for similarly coupling the opposite end of first support member 150. A second support member 155, viewable in FIG. 12, is arranged in parallel with first support member 150 on the back side of machine body 145. First and second support members 150, 155 effectively form an inner box surrounding machine body 145. Machine body 145 moves transversely along the Y-axis within the inner box, while the inner box moves longitudinally along the X-axis via rails 181, 182, 183, 184, within an outer box formed by base blocks 165, 166 on the left side and matching base blocks on the right side. In other words, the inner box and the outer box form a translation subsystem arranged in a "box-in-a-box" configuration for translating machine body 145 longitudinally and transversely in the X and Y axes, respectively.

FIG. 12 is a front perspective view of system 100 with additional components removed to better reveal hidden parts. Second support member 155 mechanically couples with upper and lower rails 183, 184 on one end and on matching rails 181, 182 (see FIG. 13) on the opposite end. First and second support members 150, 155 slidably couple with upper and lower rails 183, 184 via sliders. For example, an upper X-axis slider 153 and a lower X-axis slider 154 (also shown in FIGS. 5 and 6) are configured to provide linear actuation along upper and lower rails 183, 184, respectively, and are adapted for mounting to one end of first support member 150 (not shown in FIG. 12). Similarly, upper and lower X-axis sliders 151, 152 (see FIGS. 5 and 6) are configured to provide linear actuation along upper and lower rails 181, 182, respectively (see FIG. 13), and are adapted for mounting to the opposite end of first support member 150. In certain embodiments, X-axis sliders 151-154 translate longitudinally along their respective rails 181-184 by linear actuation via a ball-screw mechanism under control of an electro-mechanical controller. Similar sliders (not shown) are provided for mounting to both ends of second support member 155.

For moving of machine head 140 transversely in the Y-axis, first support member 150 includes upper and lower rails facing machine body 145 that slidably mount to a plate 190 via a first Y-axis slider 191, a second Y-axis slider 192, a third Y-axis slider 193, and a fourth Y-axis slider 194 (see FIG. 12). First through fourth Y-axis sliders 191-194 provide linear actuation along rails similar to X-axis sliders 151-154 described above. Second support member 155 similarly mounts on the far side of machine body 145 to another plate (not shown) having four Y-axis sliders mounted thereto for moving machine body 145 and machine head 140 in the direction of the Y-axis. Thus, machine body 145 and machine head 140 may be slid along the Y-axis direction within the inner box formed between first and second support members 150, 155. In certain embodiments, Y-axis sliders 191-194 and their matching counterparts on the far side of machine body 145 translate along rails by linear actuation via a ball-screw mechanism under control of an electro-mechanical controller.

For moving machine head 140 vertically in the Z-axis, plate 190 is configured for sliding via sliders along a pair of vertically-aligned rails, namely a first vertical rail 195 and a second vertical rail 196, which are mounted to machine body 145 as depicted in FIG. 12. Plate 190 is slidably mounted to first and second vertical rails 195, 196. Similarly, the far side of machine body 145 includes a pair of vertical rails mounted to machine body 145 (not shown). First and second vertical rails 195, 196 are moved vertically via linear actuation of Z-axis sliders (not shown) mounted to plate 190. Together with a similar slider/rail arrangement on the far side of machine body 145, Z-axis sliders enable machine body 145 to be moved vertically. In certain embodiments, Z-axis sliders translate along rails using linear actuation via a ball-screw mechanism under control of an electro-mechanical controller. However, other arrangements using similar components may be used to provide X, Y, and Z translation of machine head 140 without departing from the scope hereof.

FIG. 13 is a front perspective view of system 100 from above. A trough 147 is formed within a foundation 148 of system 100. Trough 147 is positioned beneath machine body 145 for enabling lowering of machine head 140 (e.g., to provide clearance during rotation of pallet-receiving device 110 for avoiding collisions). In certain embodiments, trough 147 is approximately one meter deep. During milling of parts 121-123, chips of scrap material fall into trough 147. The chips of scrap material may be transferred (e.g., dragged or swept) across a floor of trough 147 to a conveyor belt or other mechanism that transports the chips through a scrap chute 135 for disposal.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope.

A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A milling unit, comprising:
    a pallet adapted for holding one or more articles for machining;
    a support structure adapted to rotatably suspend the pallet above a machining tool such that the pallet is invertible via rotation about a pivot axis aligned centrally through the pallet; and
    a translation subsystem for the machining tool, the translation subsystem comprising:
        a first support member arranged substantially parallel with a second support member on opposite sides of a machine body of the machining tool;
        a first plurality of sliders coupled to opposing sides of a machine body of the machining tool;
        a first plurality of rails adapted for coupling to the first plurality of sliders, a portion of the first plurality of rails being mounted to inner sides of each of the first support member and the second support member, wherein the machine body is adapted for translating in a transverse direction along the first plurality of rails via the first plurality of sliders, respectively; and
        a second plurality of sliders on opposite ends of the first support member and the second support member, the second plurality of sliders being coupled with a second plurality of rails mounted on opposing inner sides of the support structure, wherein the machine body is adapted for translating in a longitudinal direction, perpendicular to the transverse direction, along the second plurality of rails, respectively.

2. The milling unit of claim 1, wherein the support structure further comprises a pallet receiving device, comprising:
    an axle rotatably coupled with the support structure, the axle being longitudinally aligned with the pivot axis and adapted for rotating about the pivot axis for inverting the pallet; and
    a plurality of inner latching mechanisms for securing the pallet within the pallet receiving device while inverting the pallet.

3. The milling unit of claim 2, wherein the support structure further comprises:
    a pair of beams aligned transversely on opposite ends of the milling unit for supporting each end of the axle; and
    a plurality of pillars on opposite sides of the milling unit for supporting the beams.

4. The milling unit of claim 2, wherein the support structure includes a plurality of outer latching mechanisms for temporarily securing the pallet-receiving device for preventing its rotation during milling operations and while loading and unloading the pallet.

5. The milling unit of claim 2, wherein the pallet-receiving device includes an opening such that the pallet is suspended within the opening via the plurality of inner latching mechanisms, whereby a first side of an article for machining faces a machining tool in a first orientation, and a second side of the article for machining faces the machining tool in a second orientation, the pallet being rotated within the pallet-receiving device via the axle between the first orientation and the second orientation.

6. The milling unit of claim 2, further comprising a motor coupled with the axle for driving rotation of the axle under control of a controller to rotate the support structure to any degree of rotation and maintain the support structure in any partially or fully rotated position.

7. The milling unit of claim 3, wherein the support structure further comprises a cooling subsystem to remove heat generated during a milling process, the cooling subsystem comprising one or more fluid cooling loops fluidly coupled with a pump for circulating a fluid, wherein the fluid cooling loops transfer heat from the milling unit to a heat exchanger outside of the milling unit.

8. The milling unit of claim 7, wherein one or more fluid cooling loops are located in the plurality of pillars for removing heat from the plurality of pillars.

9. The milling unit of claim 7, wherein one or more fluid cooling loops are located in panels supported by the plurality of pillars for increasing surface area for removing heat from the milling unit.

10. The milling unit of claim 1, wherein the pallet is adapted for holding articles for machining on both a first side and a second side, such that a first article is machined on the first side, followed by the pallet being inverted, then a second article is machined on the second side.

11. The milling unit of claim 1, wherein the pallet is adapted for storage and transfer from a compatible part-transfer assembly, such that the pallet is retrieved from a storage rack, one or more articles for machining are pre-loaded onto the pallet, and the pallet is transferred with the one or more articles for machining onto the support structure prior to machining.

12. The milling unit of claim 1, wherein the machining tool is adapted for translating vertically for lowering to avoid a collision while the pallet is being rotated.

13. The milling unit of claim 1, wherein translation of the first plurality of sliders along the first plurality of rails and the second plurality of sliders along the second plurality of rails is provided by linear actuation via a ball-screw mechanism under control of an electro-mechanical controller.

* * * * *